Feb. 3, 1953  R. L. HUBER  2,627,200
SYSTEM FOR THE PHOTOGRAPHING AND SHOWING
OF STEREOSCOPIC MOTION PICTURES
Filed Nov. 22, 1948  4 Sheets-Sheet 1

INVENTOR.
RALPH L. HUBER
BY Cook + Robinson
ATTORNEYS

Feb. 3, 1953 R. L. HUBER 2,627,200
SYSTEM FOR THE PHOTOGRAPHING AND SHOWING
OF STEREOSCOPIC MOTION PICTURES
Filed Nov. 22, 1948 4 Sheets-Sheet 2

INVENTOR.
RALPH L. HUBER
BY
Cook & Robinson
ATTORNEYS

Feb. 3, 1953 R. L. HUBER 2,627,200
SYSTEM FOR THE PHOTOGRAPHING AND SHOWING
OF STEREOSCOPIC MOTION PICTURES
Filed Nov. 22, 1948 4 Sheets-Sheet 3

INVENTOR.
RALPH L. HUBER
BY
Cook + Robinson
ATTORNEYS

Patented Feb. 3, 1953

2,627,200

UNITED STATES PATENT OFFICE 2,627,200

SYSTEM FOR THE PHOTOGRAPHING AND SHOWING OF STEREOSCOPIC MOTION PICTURES

Ralph L. Huber, Seattle, Wash.

Application November 22, 1948, Serial No. 61,466

3 Claims. (Cl. 88—16.6)

This invention relates to systems for the photographing and showing of stereoscopic motion pictures, and it is in the nature of an improvement upon such systems as that which is the subject matter of United States Patent No. 1,993,448, issued to me on March 5, 1935.

It is the principal object of this invention to provide a system for the photographing and showing of stereoscopic motion pictures that is practical and economically feasible for use by the motion picture industry in all of its present day ramifications of production, distribution and exhibition; that requires no change in the general manner of photographing, projecting and viewing motion pictures; whereby true stereoscopic results are obtained and made visible to all persons of a theater audience viewing the pictures, and without requiring that the pictures be viewed through any special optical apparatus or devices, or in any unusual manner.

Another object of the invention is to provide a system of the above kind that, in the photographing of the picture, provides for the photographing of complementary stereoscopic views on master films as negatives from which any number of positive films for distribution may be printed, as distinguished from the requirement of my above prior patent that the film strip on which the picture is taken be used also for the projection of the picture onto the viewing screen.

It is also an object of this invention to provide a novel form of projection, or viewing, screen whereby the complemental right-eye and left-eye views, as projected thereonto, will be reflected, respectively, to the right and left eyes of all persons viewing the picture regardless of their position in the viewing area.

Still another object of the invention is to effect stereoscopic results in the picture as viewed by the individual right and left eyes, by use of sequential views, recorded from different angles and projected at such speed as to take advantage of retinal persistency of the human eye for effecting the stereoscopic results.

In my United States patent, above referred to, I disclosed use of a projection screen having a highly diffusing, totally reflecting surface. Also, it was disclosed therein that the complemental views, for viewing by right and left eyes respectively, were photographed on a film having a lenticular surface whereby the individual ray angle directions of the complemental views were recorded on the sensitized surface of the film; the complemental views being simultaneously photographed in the same frame of the film strip by a camera with two horizontally spaced, common axis objectives. Furthermore, in the use of the lenticulated film strip for the showing of the pictures, the complemental "right" and "left" views as recorded thereon, are projected onto a screen simultaneously and in coincidence, and are reflected from the screen in divergence to the corresponding eyes of each observer. The system as thus disclosed in my prior patent, which I refer to as the lenticulated negative process, is well suited to amateur fields, but is not a practical system for the general production of pictures for commercial distribution as carried on at the present time, where innumerable copies are required. Therefore, the present invention has had, as one of its prime objects, the provision of a system that makes possible the photographing of a picture on the common types of flat record films that become the "master films" and the reproduction of any number of copies from the master films.

Yet another object of this invention has been to provide a system of stereoscopic photography that avoids causing any eye strain, and reproduces the composite views in true stereoscopic images without distortion, regardless of the angle relative to the projection screen, at which the picture is viewed by the observer.

Other objects of the invention are to be found in the combination and relationship of devices used in the photographing and in the projection and viewing of the pictures, and particularly in the details of the screen on which the pictures are projected for viewing and whereby the views are reflected to the eyes of the spectators.

In accomplishing these and other objects of the invention, I have provided the improved details of construction, the preferred forms of which are illustrated in the accompanying drawings, wherein.

The present invention is based upon the fact that stereoscopic results can be obtained in pictures by the photographing of a scene by two cameras in horizontally spaced relationship, corresponding substantially to the horizontal spacing of the human eyes, then projecting these views in coincidence onto a projection or viewing screen and viewing them by use of means that causes the right eye to see only the right view and the left eye to see only the left view; the reason being that an object is visible only when the integral stimuli rays emanate from the identical point as the point of intersection of the parallax. This accounts for the eyes seeing only their correct respective views, since if both eyes should shift to the view of one of the eyes, then the parallax and focal point would not coincide.

Briefly described, the present system contemplates the use of two synchronized cameras for simultaneously photographing complemental stereoscopic views, a sensitized film strip for each camera, on which the views are photographed, a qualified projection screen whereby the right and left views as projected thereon are made visible by reflection to the right and left eyes of the viewer, respectively, and apparatus for projecting the complemental views, as printed from the master films, onto the viewing screen in coincidence. The process may be best explained and understood by proceeding step by step backward in the process from the eyes of an observer to the camera.

Primary concern must turn to the natural requirements of both the human eye and binocular vision. The coordinated pair of human eyes are geometrically spaced apart for the purpose of receiving slightly relatively different views of the same field and as a range finder of field depth. The foveas of the two retinas coordinate accordingly in supplying stereoscopic stimuli for mental interpretation. The visual center spot, or fovea, of the retina is minute in size and is the only point of true conscious vision. In order for the eyes to see objects of any size at all, the eyeballs must shift by turning slightly in their orbits so that the visual center spots may scan the entire object for scrutiny. The axes of the two eyes converge upon each integrant of the object being scanned. That part of the retina surrounding the visual center spot receives images, but only to serve to hold the relationship of the object to the surrounding area. With these functions common to both eyes, their coordination sends binocular stimuli to the brain, where the mental outward projection gives us stereoscopic vision. The angle of convergence of the axes of the two eyes must intersect in the integrant of the object being viewed. It is different convergence of the eyes, as a range finder, that imparts feelings of distance of objects from the viewer. Therefore, in order to have true stereoscopic pictures, the binocular vision must receive two views that are geometrically related and having the integrant ray angles actually appear to emanate from their respective points in space, as they did in space in the actual scene.

Since stereoscopic picture results can be obtained by the simultaneous viewing of "right eye" and "left eye" views, as previously explained, and since the present system is concerned with the viewing of a stereoscopic moving picture by theater audiences, without use by any viewer of optical equipment to obtain the stereoscopic result, it is manifest that such pictures must be displayed on a screen, and that this screen must be qualified, that is, the screen must be of a special character that will effect the segregation of the right-eye and left-eye views and reflect them to the corresponding eyes of each and every observer, regardless of the location of the observer in the viewing area. The viewing screen should be void, to the maximum degree, of ray-confusing refractions. For instance, a white sheet employed as a screen would permit the stereoscopic rays to be jumbled by microscopic refraction thusly mixing the two views and causing their value to be lost.

A stereoscopic screen for the purpose of the invention herein disclosed must be highly and totally reflective with no secondary reflections, highly diffusive and non-jumbled-refractive.

The projecting apparatus must be of a kind whereby complemental stereoscopic views can be thrown onto the viewing screen in substantial coincidence, and the photographing apparatus must be such as to photograph the scene or views in substantially the same manner as they are observed by a person in viewing them from the location of the camera; that is, the apparatus should comprise two cameras, disposed side by side in spacing simulating or corresponding to the spacing of the human eyes and having their lens systems focused on the scene and their axial lines converging to intersection in the plane of action as would the axes of the human eyes in viewing a scene of action.

Figure 1:
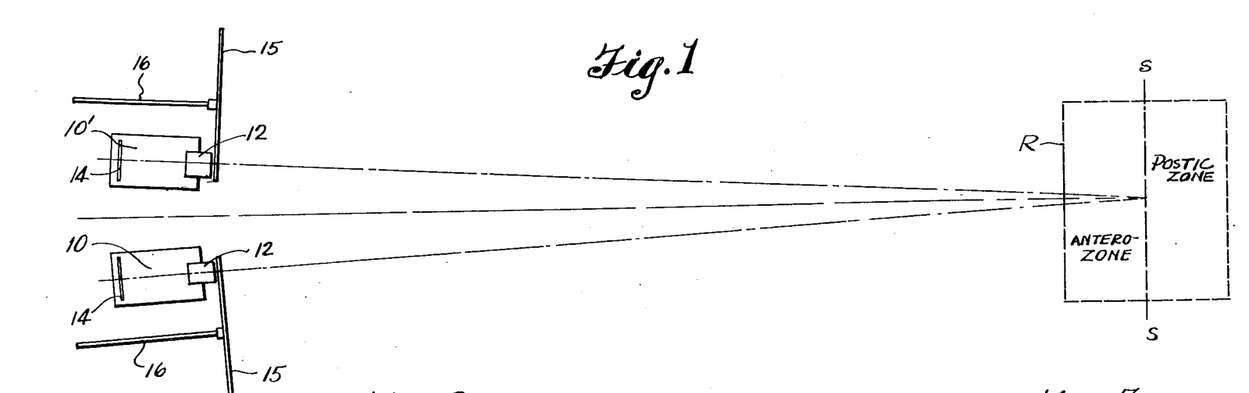
Fig. 1 is a view diagrammatically illustrating an apparatus and its set-up or arrangement for the photographing of complemental stereoscopic views in accordance with the present invention.

Referring now more in detail to the drawings, and first giving consideration to the apparatus of Fig. 1 for taking the pictures, that is, for photographing the field of action:

For this purpose I employ two motion picture cameras. These have been designated in their entireties by reference numerals 10 and 10'. They are alike in all respects except as is required to adapt each to its particular relationship with the other. Each camera has an objective lens system, designated by numeral 12, and is provided with the usual mechanism, not herein shown, for advancing its film strip intermittently for the photographing of successive views thereon through its lens system. The two cameras, 10 and 10', are equipped with means, not shown, whereby they are caused to operate in exact synchronism, and are mounted for and equipped with means for focusing and means for effecting adjustment for convergence of the axial lines of the lens systems on points at various distances from the camera.

Each camera contains a flat film strip 14 on which the views as exposed by that camera are recorded in succession, and each camera also is equipped with a shutter of special design used in effecting exposure of the film for the recording of the views, and these shutters are operated in exact timing with the intermittent advance movements of the film strips 14. The shutters will now be described:

Each shutter comprises a round disk 15 supported by an axial drive shaft 16, and the two shafts are geared together, by means not herein shown, to cause the disks to rotate in unison. As noted in Fig. 1, which is a plan or top view of the picture-taking apparatus, the cameras are set side by side. The horizontal spacing of their lens systems 12—12 should be approximately equal to the spacing of the human eyes. The shutter disks 15—15 are set just forward of the cameras in such relationship to the lens systems 12 to properly control the exposure of the film strips to the views.

Figure 2:
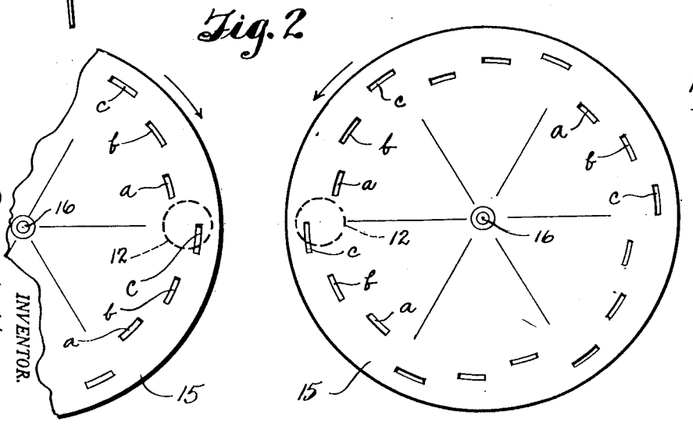
Fig. 2 is an elevation of the sequential shutters as used in conjunction with the two cameras which photograph the complemental views on the film strips which serve as master films.

As shown in Fig. 2, each shutter disk 15 comprises six equal segments, as indicated by the radial lines thereon, and each segment is formed with three exposure openings, these being designated by reference characters a, b, and c. These exposure openings are in the form of arcuate slots, located concentric of the axes of rotation of the disks. Each opening or slot extends through ten degrees of the circle in which it is located, or its equivalent with respect to the speed of the film, and the slots are successively advanced at twenty-degree, center-to-center spacing. Also, the slots of each segment are arranged at such spacing, measured radially from the axial center of rotation of the disk, as to pass in front of the lens of the corresponding camera, each to effect exposure of the film to a view and in passing to successively effect exposure through three different vertical zones of the lens. For example, each opening a in passing the lens, regardless of direction of rotation of the shutters, will uncover a vertical zone across the outside third of the lens. The openings b will likewise effect exposure through a vertical zone which comprises the central third of the lens, while the openings c, in passing, will effect exposure through a vertical zone comprising the inside third of the lens. For better understanding, I will refer to that part of a lens 12 that is nearest the other lens as the inside third, and the part that is farthest from the other lens, as the outside third.

In the present instance, the exposure openings a, b, and c are separated in the circular direction of the disk by intervals of ten degrees. Thus, after each exposure, by reason of an opening in the shutter passing the open lens, the lens will be covered for a corresponding interval, and it is during these latter intervals, when the lens is covered, that the film strip on which the views are photographed, is advanced.

For the taking of a picture, the cameras, as connected for synchronous action, are set up in the usual manner, at a proper or desirable distance from the scene to be photographed. Then they are adjusted to cause the axial lines of their lens systems to converge in what might be referred to as the screen zone of the scene to be photographed; this zone coinciding with an imaginary vertical plane across and located at about the center of the area in which action is to be photographed, or in which attention is to be centered. For a better understanding of the arrangement, I have, in Fig. 1, indicated the area of a scene that is to be photographed by the dashline rectangle R and have represented the screen zone by the line S—S. The area forward of the line S—S is designated as the "antero-zone," and that rearward of the line S—S is designated as the "postic-zone." In the set-up of cameras 10 and 10', the axial lines of their lens systems are converged to intersect in the screen zone, substantially centrally of the area of the scene, and this adjustment is retained during the photographing of the picture in this area under ordinary circumstances. The lenses are brought to sharp focus on the object or person in the screen zone and under ordinary circumstances is retained there.

With the shutter disks 15—15 rotating in timed synchronism with the intermittent advance movements of the film strips 14—14, the operation is such that exposures are made with the passing of each shutter opening past the corresponding lens 12, and complemental views are thus photographed simultaneously on the two master films. Furthermore, in consideration of the fact that the openings a, b, and c of the two disks are so located as to effect exposure of the film through different sections or zones of their respective lens systems, each film strip will have recorded thereon, in successive frames, images of the scene as viewed from three slightly different angles. This gives a complete sequential lens area record for the individual eye focus.

Figure 3:
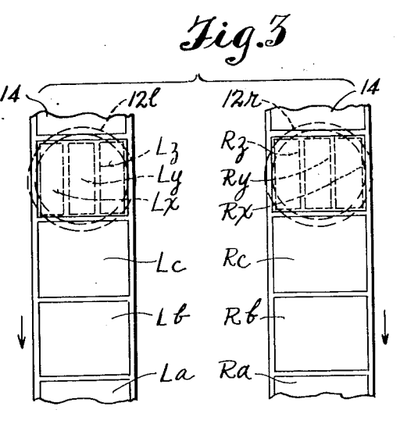
Fig. 3 is a view of short lengths of the film strips for recording complemental views and indicating their relationship to the lens systems of the corresponding cameras.

Explanatory to the taking of successive views, I have shown, in Fig. 3, short lengths of the film strips 14—14, and in dotted circles, 12r and 12l, have indicated the relative position of the lens systems 12—12 through which exposures are made as the film strips are advanced. Successive frames of the film strips on which exposures are made through the openings a, b, and c respectively, are designated on the film strip that records the right-eye views as Ra, Rb and Rc, and on the film strip that records the left-eye views the complemental frames are designated as La, Lb and Lc. In those frames that are shown as being registered with the lens systems, I have indicated, by the dotted-line rectangles, Rx, Ry and Rz, in the right-side film strip, and as Lx, Ly and Lz in the left-side strip, the relative positions of exposure by the openings a, b, and c in passing the right and left lenses for the photographing of sequential views. From this explanation it is to be understood that the stereoscopic effect in projection is to be accomplished not only by the binocular viewing of complemental right-eye and left-eye views, but also a reasonable degree of stereoscopy in each eye will be derived from the respective three sequential views.

In connection with the above, it is also to be pointed out that the present invention anticipates that the speed of operation, that is, the rapidity of taking successive exposures, be considerably faster than in ordinary picture taking. It must be of such speed that the images projected from three sequential frames will be placed on the screen within a period that the retinal persistency of the human eye will effect a simultaneity.

The silent picture projectors (amateur) presented sixteen exposure frames per second, which includes sixteen dark periods for frame progress changes. At this rate, three sequential component frames, to equal one regular frame, would amount to forty-eight frames per second.

Figures 4, 5, 6:
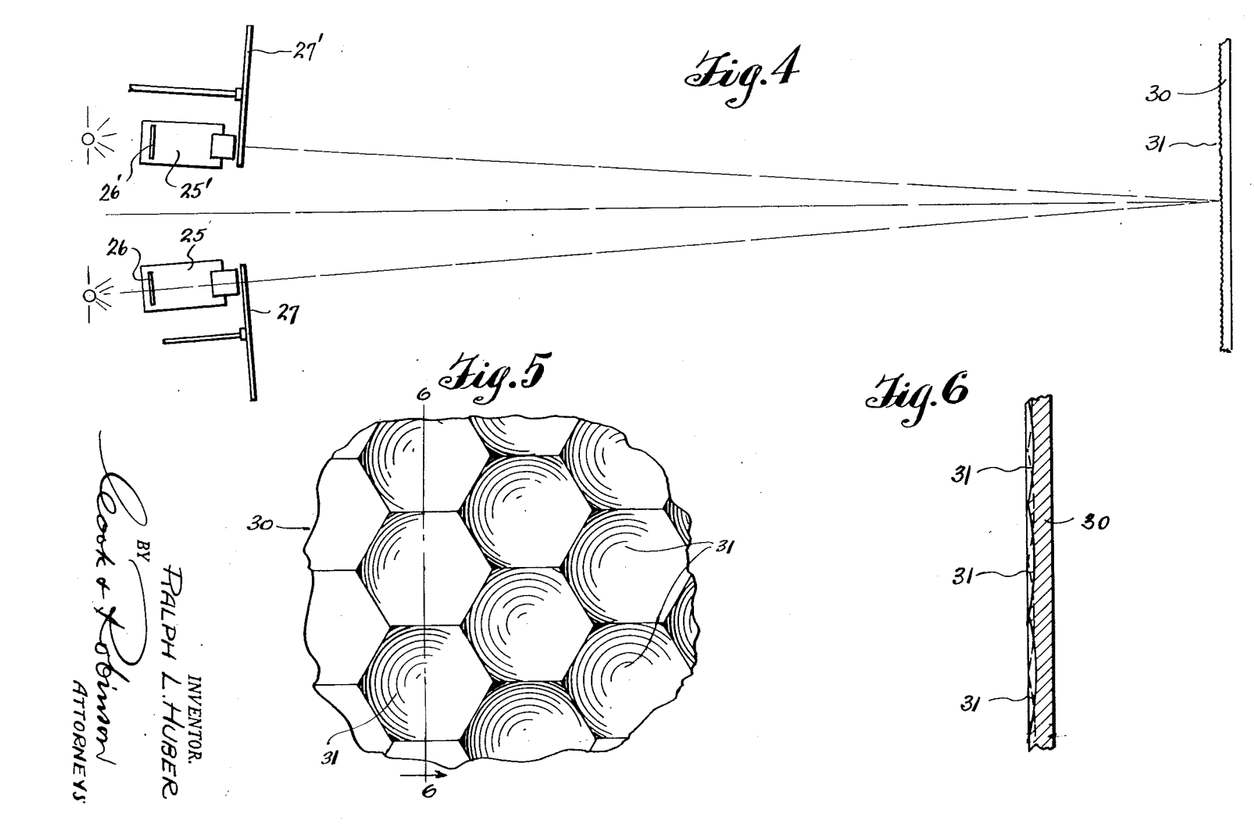
Fig. 4 is a view diagrammatically illustrating apparatus as used for the projecting onto the viewing screen of the complemental views as photographed by the apparatus of Fig. 1.
Fig. 5 is a view showing a magnified portion of the reflecting surface of the projection screen.
Fig. 6 is a cross-section taken on line 6—6 in Fig. 5.

Referring next to Fig. 4, wherein I have diagrammatically shown the arrangement of apparatus for projecting the pictures onto a viewing screen:

The projectors, designated respectively by reference numerals 25—25', may be of the usual type. They are connected for synchronous operation and for the projection of successive views onto a viewing or projection screen at the same speed as the views were photographed by the cameras. The film strips on which the views have been printed from the master films 14—14 are herein designated at 26 and 26'. Shutters as at 27 and 27', like those designated at 15 and as used in the cameras for the taking of the pictures, are here mounted in a like manner and are operated in timing with the intermittent movements of the film strips, to cause the views as projected onto the screen to emanate from zones or sections of the projector lens corresponding to that through which the views were recorded or photographed. That is, the sequential views will, in succession, be projected through the inside, central and outside thirds or sections of the projector lenses and through corresponding openings a, b and c in the shutters of the projector apparatus, onto the projection screen. The rate of projection here is such that retinal persistency of the eye will effect the result of simultaneity.

In setting up the projectors, they are adjusted to cause the axial lines of the lens systems to intersect in the plane of the projection screen and are brought to focus therein in the same manner as were the cameras in the photographing of the picture.

The projection screen is designated, in Fig. 4, by reference numeral 30. The screen surface on which the complemental views are projected in coincidence is formed over the entire viewing area with minute, curved, mirror-like surfaces. These spherically curved reflecting surfaces are in juxtaposition, giving best results with no intersticial spaces. To accomplish this construction with no intersticial spaces, the mirror-like surfaces 31 are made in hexagonal outline as shown in enlargement in Fig. 6, all of the same size and set in the same plane, after the fashion of assembling hexagonal tile in a floor. The centers of curvature of all these spherical surfaces 31 lie in the same plane. This plane is parallel with the plane of the screen, either forwardly or rearwardly thereof, depending on whether the reflecting surfaces are convex or concave. The screen, preferably, is placed in a plane that is perpendicular to the general line of projection.

Assuming that pictures have been taken by the cameras in accordance with the explanation given in connection with Figs. 1, 2 and 3, and that prints have been made from the master films 14—14 in the usual way, and that these prints, as represented in Fig. 4 by the film strips 26 and 26', are assembled with the corresponding projectors, 25—25', and that the latter are then operated in such manner that complemental views are projected onto the screen in coincidence and with the sequential rapidity specified, a true stereoscopic result will be effected.

Figure 7:
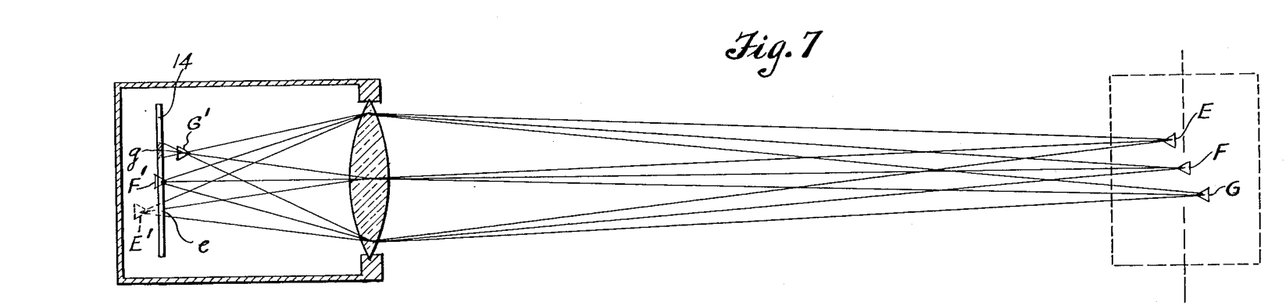
Fig. 7 is a view diagrammatically illustrating the individual recording or photographing on a record film of the three respective zone views by one of the cameras.

An explanation of the reason for the stereoscopic result obtained by the present system is as follows:

First giving consideration to the photographing and to Fig. 7, wherein the photographing of a scene by the lens system of one of the cameras, here shown in exaggerated scale, is illustrated: In this view I have indicated objects E, F and G as located in the area of action at different distances from the camera, and for easier explanation and illustration, have shown them out of alignment. In this view the sequential exposure of successive frames of the film through openings a, b and c of the shutter has, for better illustration, been disregarded. The light ray lines emanating from these objects E, F and G represent sample pencils or cones of light. The camera is directed toward the median object F and is focused thereon. Thus the image of object F will be in sharp focus on film strip 14, that is, in what I refer to as the film zone. Therefore, sharp images of objects E and G will not be located in the film zone, but the image of object E will be brought to focus in the camera beyond the plane of the film, at E', and that of object G will be directed toward a sharp focus at G' forwardly of the film.

Now, in projecting this view, as printed on an exhibiting film 26, onto a screen 30, as indicated in Fig. 4, it is obvious that objects which have been photographed in the film zone will be brought to sharp focus on the screen. Objects that were located, when photographed, in the antero-zone, will photograph on the film inversely in the postic-zone. Then when projected onto a screen, they come to focus in the antero-zone of the screen. Objects photographed in the postic-zone will be recorded inversely in the antero-zone of the film, then, when projected, would have come to focus in the postic-zone of the projection screen.

Now, it will be understood by reference to Fig. 7, that the pencil of light from object G headed for its focus at G' in the antero-zone is photographed on the film 14 as a reversed circle of confusion at g. The pencil of light from object G is shown as coming to a focus in the postic-zone of the film at E', then in diverging it is intercepted by the film 14 and is photographed thereon as a normal circle of confusion at e. The light cone from the object F comes to a sharp focus in the plane of the film strip at F' and is photographed thereon without confusion.

Figure 7A:
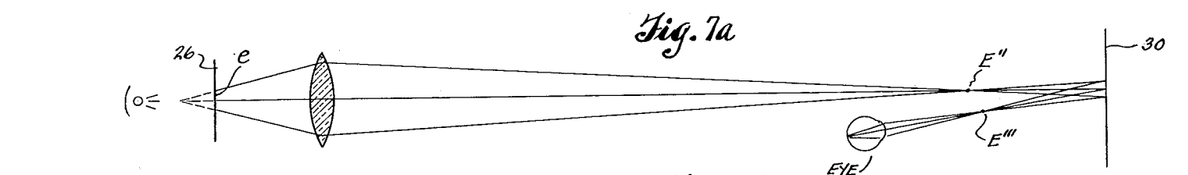
Figs. 7a, 7b and 7c diagrammatically illustrate the single projections of these three views of objects located in the antero-zone, the screen zone and the postic-zone, as projected by one of the two projectors, and each as viewed by its respective single eye.

In projecting the images of the photographed views of objects E, F and G, the image of object F is brought to sharp focus in the plane of the projection screen. In order to project the image of E' or of G' in the actual locations of E and G, then the ray angle of reception must be recorded accordingly. To accomplish this, the retinal image persistency must be relied upon and it is for this reason that the high-speed sequential recording of views on each film strip by exposures through the shutter openings a, b, and c is provided for. When sequential views are photographed in this way, and are then projected in rapid succession upon my qualified screen in the same order and speed at which they are photographed, they will converge to a point of location of the actual image. If the ray angles and areas are recorded as stated, and the binocular relationship of the right and left views are retained in stereoscopic photography, true stereoscopic results will be attained in viewing. This is dependent, however, on the speed of projection from sequential frames being such as to present all areas before the loss of retinal persistency sets in. The results are further explained in connection with Figs. 7a, 7b and 7c as follows:

In the projection of object E as in Fig. 7a, having first been photographed successively through the three lens zones onto the three sequential film frames of the record strip 14 as a circle of confusion e, the light sent through the corresponding sequential frames of the film strips 26, which is printed from record film 14, and through the lens zones corresponding to those through which they were taken, will converge to point E'', where they cross, diverging to the screen, 30, which causes them to be reflected and to intersect again at actual image of E visible at point E''' in the antero-zone of the screen. The mental outward projection, being true, causes the observer to visualize the object at E'''.

Figure 7B:
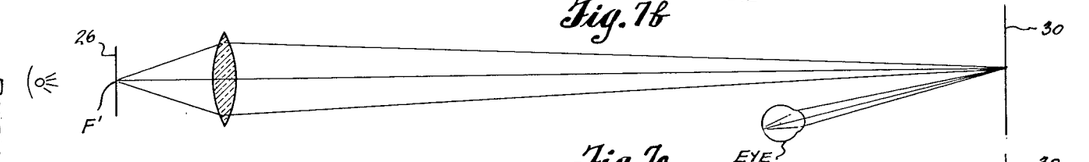

Likewise, as shown in Fig. 7b, the image of object F, photographed as F' in the film zone, will be projected through sequential frames of the film 26 sharply on the surface of the screen, where the light rays are reflected divergently to the eye and therein converged to the retina, thus appearing as emanating from the plane of the screen.

Figure 7C:
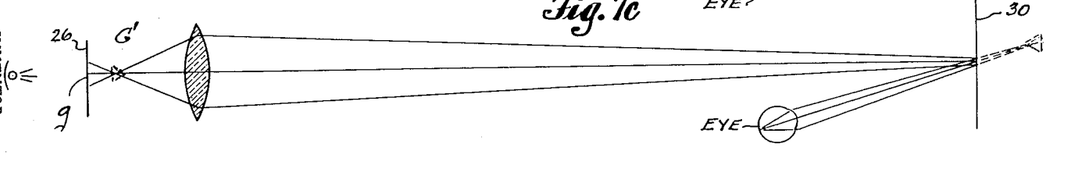

Fig. 7c likewise illustrates the sequential projection of the image G' of the object G located in the postic-zone and photographed in the sequential frames on the film strip 14 as a circle of confusion g as the light rays converged toward their focal point. These rays, as projected from sequential frames, diverge to the projector lens, by which they are converged toward the screen, reaching it without having come to a focus, and being reflected back in divergence to the pupil of the eye and focused therein on the retina, where the mental outward projection places the minute image integrant where the mental image outward projection visualized it back of the plane of the screen.

While view Fig. 7 illustrates but one camera, and the views of Figs. 7a, 7b and 7c illustrate but one projector, it is to be understood that the functions of both cameras are alike, as also are the functions of both projectors.

Views recorded by the cameras 10 and 10' as "right-eye views" and "left-eye views," as projected onto the screen, are, by reason of its qualified surface, reflected back to the right and left eyes, respectively, of all persons viewing them.

Figures 8, 8A, 8B:
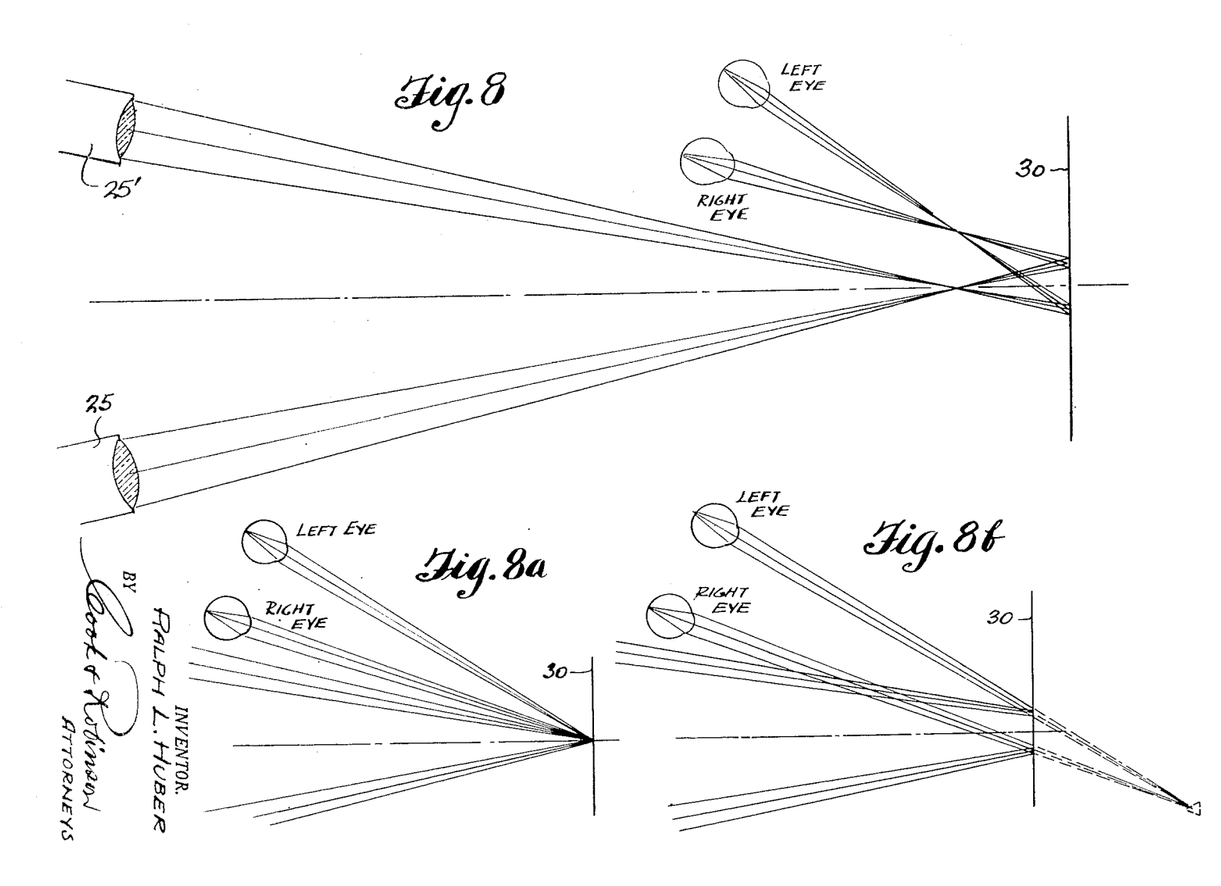
Fig. 8 is a view diagrammatically illustrating the reflection of antero-zone views, as projected onto the screen, to the pair of eyes of a person viewing the picture.
Fig. 8a is a similar view showing the screen zone view as projected onto the screen and as viewed by the pair of eyes.
Fig. 8b is a similar view showing the postic-zone view as projected onto the screen and as viewed by the two eyes.

The reflection by the screen of the complemental right and left views to the corresponding eyes of the persons viewing the picture has been illustrated in Figs. 8, 8a and 8b.

The projectors, as indicated, are set up in a manner whereby the axial lines of their lens systems intersect in the screen zone, and the lenses are focused so that a view photographed in the screen zone by the cameras, as explained in connection with Fig. 1, will be brought to sharp focus on the screen. Now, for best results, with the understanding that the screen is placed in a plane that is at a right angle to the bisector of the parallax of the two projectors, it will be understood that the light rays projected onto the screen from each minute integrant of the image will be reflected to a refocus, or apparent refocus, so that rays emerging from the point of refocus will appear to be emanating from the actual image at that relative point in space. The point of refocus is the only point where the integrant is discernable because if the eyes shift to a point nearer or more distant than the true point, all will be blurred by circles of confusion.

In the projection of a picture by the right and left projectors, all integrant rays of objects photographed in the screen zone will come to focus on the screen. All integrant rays of objects photographed in the foreground or antero-zone will appear to emanate from a similar point out in front of the screen as the actual object that was out in front of the screen zone in photography. The distant objects will appear back of the plane of the screen as the virtual images, the same as images appear to be formed behind the plane of the ordinary mirror. The eyes will be unable to see an object at any other location than at the point location of the integrant.

In Figs. 8, 8a and 8b, respectively, the right eye and left eye of an observer have been shown to be observing the projected stereoscopic view of objects E, F and G as photographed in Fig. 7. The angles of projection here are exaggerated for easier understanding and illustration.

In Fig. 8 the two eyes are focused on the image of an object that was photographed in the antero-zone, for example, the object E in Fig. 7. The views as projected converge to a focus in front of the screen, then diverge to the screen and are reflected to a focus in front of the screen.

In Fig. 8a, the complemental views of an object which was photographed in the screen zone, are brought to focus on the screen and appear to be in the plane of the screen.

In Fig. 8b, the complemental views of an object photographed while back of the screen zone, for example, as the object G in Fig. 7, are converged toward the screen, and are intercepted by the screen before coming to a focus, then are reflected back to the eyes in divergence, thus appearing to emanate from a point back of the plane of the screen.

In accordance with the foregoing description, stereoscopic results may be obtained without requiring that the observers view the pictures through any optical apparatus for segregating right and left-eye views. The photography is on the ordinary motion picture film now used for this purpose. The printing from the master films onto projection films is in accordance with present day practice and the exhibition of the pictures is according to present day practice. The only requirement that is not according to present day practice, is in the use of synchronized cameras, equipped for high-speed recording of the sequential views as described, the projection of these views in coincidence by synchronized projectors, and the use of the qualified screen, as described.

Having thus described my invention, what I claim as new herein and desire to secure by Letters Patent is:

1. Apparatus for the taking and projecting of stereoscopic pictures comprising a picture taking assembly and a picture projecting assembly; the picture taking assembly comprising a pair of aligned laterally spaced cameras; each camera having an image receiving film strip with means for intermittently advancing the strip, an objective lens and a shutter mechanism; each of the strip advancing means and each shutter mechanism being operated in synchronism with each other; the picture projecting assembly comprising a pair of aligned laterally spaced projectors with each projector having an illuminating means, means for intermittently advancing an image containing film strip, a shutter mechanism and a projecting lens; each of the film advancing means and each shutter mechanism of the projectors being operated in synchronism with each other, each shutter mechanism of the cameras and projectors controlling a plurality of light passages at different distances radially from the axial line of the objective lens which, in their admittance of light rays through the objective lenses and projecting lenses, divide each lens into a plurality of zones coinciding with the location of the corresponding light passages; the shutter mechanism of each camera and its similarly disposed projector providing their light passages in the same relationship to each other so that the zones of corresponding objective and projecting lenses are opened in the same corresponding manner and in the same sequence; the pair of cameras being so disposed that each of their objective lens is focused on a common point of the objective scene being photographed; each of the light passages as provided by the shutter mechanism in opening its zone of the objective lens will allow only a portion of the rays of light reflected from the objective to impinge on a frame of the image receiving film with each succeeding exposure as provided by the shutter mechanism allowing a different portion of the rays of light reflected from the objective to impinge upon succeeding frames of the image receiving film through the coinciding zones of each of the objective lenses, and projecting from each of the projectors the images on the successive frames of the film in the same sequence as taken by each of the corresponding cameras by reproducing rays of light from the illuminating means of each projector and projecting them through the successive frames of the image containing film, through each succeeding light passage of the shutter mechanism and through each coinciding zone of each projecting lens in the same sequence as the images were received by the successive frames onto a viewing screen having its entire reflective face covered with minute spherically curved reflective surfaces which are totally reflective and substantially non-refractive.

2. The method of taking and projecting stereoscopic pictures consisting of causing rays of light reflected from an objective scene to pass through each objective lens of a pair of cameras set to correspond to the human right and left eyes and to impinge upon image receiving films housed in the cameras and projecting the images on the film by causing reproduction of the light rays through each projecting lens of a pair of projectors set to correspond to the human right and left eyes, each objective lens and each projecting lens being divided into similar zones, causing only a portion of the reflected light to impinge on the image receiving films by opening each zone of each objective lens in succession so that different portions of the reflected light is impinged on succeeding portions of the film, projecting the images on the film by opening succeeding zones of each projection lens in succession so that different portions of the reproduced light are allowed to pass through the succeeding zones of each projecting lens, the zones of each objective lens of the cameras and the zones of each projecting lens of each similarly disposed projector being opened in the same corresponding manner and in the same sequence, the projection being made upon a totally reflective and substantially non-refractive surface comprising minute spherically curved reflectors so that the projected picture thereon may be viewed by the naked human right and left eyes simultaneously.

3. The system of taking and projecting stereoscopic pictures comprising the use of a pair of aligned laterally spaced cameras set to simulate the human right and left eyes, and a pair of aligned laterally spaced projectors set to simulate the human right and left eyes, each camera having an image receiving film strip therein, means for intermittently advancing the film strip, an objective lens and a shutter mechanism, each film advancing means and each shutter mechanism of each camera being operated in synchronism, each projector having an illuminating means, an image containing film strip, means for intermittently advancing the film strip, a shutter mechanism and a projecting lens, each film advancing means and each shutter mechanism of each projector being operated in synchronism, each shutter mechanism of each of the cameras and projectors controlling a plurality of light passages at different distances radially with respect to the axial line of the objective lens which, in their admittance of light rays through the objective lenses and projecting lenses divide each lens into a plurality of zones with each zone corresponding to each light passage of each shutter mechanism, the shutter mechanism of each camera and its similarly disposed projector providing their light passages in the same relationship to each other so that the zones of corresponding objective and projecting lenses are opened in the same corresponding manner and in the same sequence, the light passages of each shutter mechanism of the cameras allowing a portion of the light rays reflected from an objective scene to pass through its zone to impinge on the image receiving film, with each succeeding light passage allowing different portions of the light rays reflected from the objective scene to pass through their respective zones of each objective lens and to impinge on successive frames of each image receiving film strip, and projecting an image from the image containing film strip from each projector onto a viewing screen by allowing a portion of the reproduced light rays from the illuminating means to pass through a light passage of the shutter mechanism and its corresponding zone of each projecting lens onto the screen, and allowing different portions of the reproduced light from the illuminating means to pass through the successive frames of the image containing film and each succeeding light passage of each shutter mechanism and through their respective zones and each projecting lens onto the viewing screen in the same sequence as that in which the objective scene was taken by the corresponding camera, the viewing screen having its entire reflective face covered with minute spherically curved reflective surfaces which are totally reflective and substantially non-refractive and which will receive the images reproduced by the pair of projectors which have been set to simulate the right and left eyes and which will reflect the images back to the right and left eyes of one viewing the screen.

RALPH L. HUBER.

REFERENCES CITED

The following references are of record in the file of this patent:

UNITED STATES PATENTS

| Number | Name | Date |
|---|---|---|
| 1,276,838 | Wayditch | Aug. 27, 1918 |
| 1,311,008 | Quick | July 22, 1919 |
| 1,472,608 | MacBeth | Oct. 30, 1923 |

(Other references on following page)

UNITED STATES PATENTS

| Number | Name | Date |
|---|---|---|
| 1,535,985 | Clark | Apr. 28, 1925 |
| 1,550,880 | Clark | Aug. 25, 1925 |
| 1,568,023 | Mannus et al. | Dec. 29, 1925 |
| 1,596,835 | Hewson | Aug. 17, 1926 |
| 1,714,849 | Daponte | May 28, 1929 |
| 1,911,320 | Barbier | May 30, 1933 |
| 1,978,250 | Dilks | Oct. 23, 1934 |
| 2,016,937 | Barnes | Oct. 8, 1935 |
| 2,063,004 | Louisot | Dec. 1, 1936 |
| 2,086,556 | Jacobson | July 13, 1937 |
| 2,132,904 | Martinez et al. | Oct. 11, 1938 |
| 2,223,630 | Levy | Dec. 3, 1940 |
| 2,331,941 | Terwilliger | Oct. 19, 1943 |
| 2,517,246 | Seitz | Aug. 1, 1950 |

FOREIGN PATENTS

| Number | Country | Date |
|---|---|---|
| 388,157 | France | May 23, 1908 |
| 173,833 | Great Britain | Dec. 25, 1921 |
| 178,344 | Great Britain | Apr. 20, 1922 |
| 477,384 | Great Britain | Dec. 28, 1937 |